Aug. 5, 1958 W. I. ALHOLM ET AL 2,846,335
APPARATUS AND METHOD FOR APPLYING CONTAINER SEALING MATERIAL
Filed April 29, 1955 3 Sheets-Sheet 1

Inventors
Wayne I. Alholm
Sidney R. Ballou
Arthur J. Lynn
Richard P. Stokes
Dunbar L. Shanklin By
Theodore C. Browne
Attorney Inventors
Wayne I. Alholm
Sidney R. Ballou
Arthur J. Lynn
Richard P. Stokes
Dunbar L. Shanklin By Theodore C. Browne
Attorney Inventors
Wayne I. Alholm
Sidney R. Ballou
Arthur J. Lynn
Richard P. Stokes
Dunbar L. Shanklin By Theodore C. Browne
Attorney

United States Patent Office 2,846,335
Patented Aug. 5, 1958

2,846,335

APPARATUS AND METHOD FOR APPLYING CONTAINER SEALING MATERIAL

Wayne I. Alholm, Stoughton, Sidney R. Ballou, Lexington, Arthur J. Lynn, Reading, Dunbar L. Shanklin, Winchester, and Richard P. Stokes, Malden, Mass., assignors to W. R. Grace & Co., Cambridge, Mass., a corporation of Connecticut Application April 29, 1955, Serial No. 504,742

7 Claims. (Cl. 117—97)

In applying a container sealing material to the sealing area of a container closure, the art today places a stream of liquid compound on the sealing area while the closure revolves beneath a nozzle through which the sealing compound flows. Subsequently, the liquid compound is dried or otherwise converted into a solid sealing mass so that a gasket is formed, which may seal securely a joint between the glass and closure elements or between the respective metal parts of a container.

Many of these compounds are plastic or pseudo-plastic substances which can move and change shape in response to applied force. The word liquid in the specification and claims is to be read as including such substances.

A common type of compound-applying machine removes a blank closure from a stack; slides the closure along a table; places it on a continuously revolving chuck, where the compound is applied and placed; pushes the closure from the chuck; tucks it beneath a stack of finished closures; and places a new closure on the chuck in a single cycle of operation. In such a machine, the shut-off of flow through the nozzle must occur at the precise instant that the closure, which has been revolving beneath the nozzle, has completed a revolution of 360° or some exact multiple thereof. If the shut-off point is not exact and the closure has revolved through more than 360°, another layer of liquid compound will be deposited in the arc of overlap. The resulting gasket then will be thicker in the arc portion where the overlap occurred. On the other hand, if the shut-off point occurs before the closure has made a complete revolution, a gap is created in the gasket. Therefore, the revolution of the closure and the opening and closing of the nozzle must be exactly corollated.

To make a uniform gasket, a definite quantity of compound must be distributed evenly, circumferentially around the closure and be properly distributed, that is, placed in the correct position to secure a seal. A can cover and a tumbler closure are good illustrations of compound distribution. The nozzle places a ring of compound of roughly semicircular cross section in the channel of the end. Spin flattens the cross section and slides the compound outwardly under the cover hook. In a skirted tumbler closure, the compound, which has been placed in the corner between skirt and panel, climbs the skirt and forms, as the spin progresses, a wedge lying against the vertical wall.

Assuming a compound of fixed viscosity, the amount of compound that may be forced through a nozzle at any given pressure is a constant. In other words, the quantity of compound delivered to the closure is determined by the quantity of compound flowing in a unit of time x time. It follows that volume and position of the gasket are determined by the mutual adjustment of the following variables: the size of the nozzle orifice, the delivery pressure, the time that the nozzle is open, and the speed and amount of after spin—all of which are fundamentally determined by the rheological properties of the liquid compound itself.

These variables can be corollated, and identical closures can be made. However, to correct for the slight changes or misfunctionings which always occur in factory practice, skill is demanded which is far beyond that possessed by the machine operator. When a machine drifts out of tolerance limits, it cannot be put back on the line until an experienced machine adjuster has reset the entire range of adjustments.

By analyzing the causes of machine shutdown, we have determined that it most frequently occurs because of poor placement of the compound. Assuming constant viscosity of the compound, once the lift of the needle valve is set, feed pressure adjusted, and opening and shut-off points fixed, these adjustments tend to remain constant throughout a day's operation. Placement, however, tends to wander. The causes are obscure but may be connected with the amount of residual oil left on the closure after the forming operation, and a possible contributing cause may be slight variations in the condition of the enamel surface after baking.

To correct wandering, the peripheral velocity of the closure must be changed on existing machines. This requires changing all adjustments.

The machine which is the subject of the present invention is characterized by breaking the operation into two steps performed by two separate elements of the machine. For clarity, the drawings have been greatly simplified; and standard components, such as the electropneumatic nozzles, supply pipes, vacuum connections, supply pipes, wiring, and details of the indexing drive, have been indicated in outline or omitted.

Figure 1:
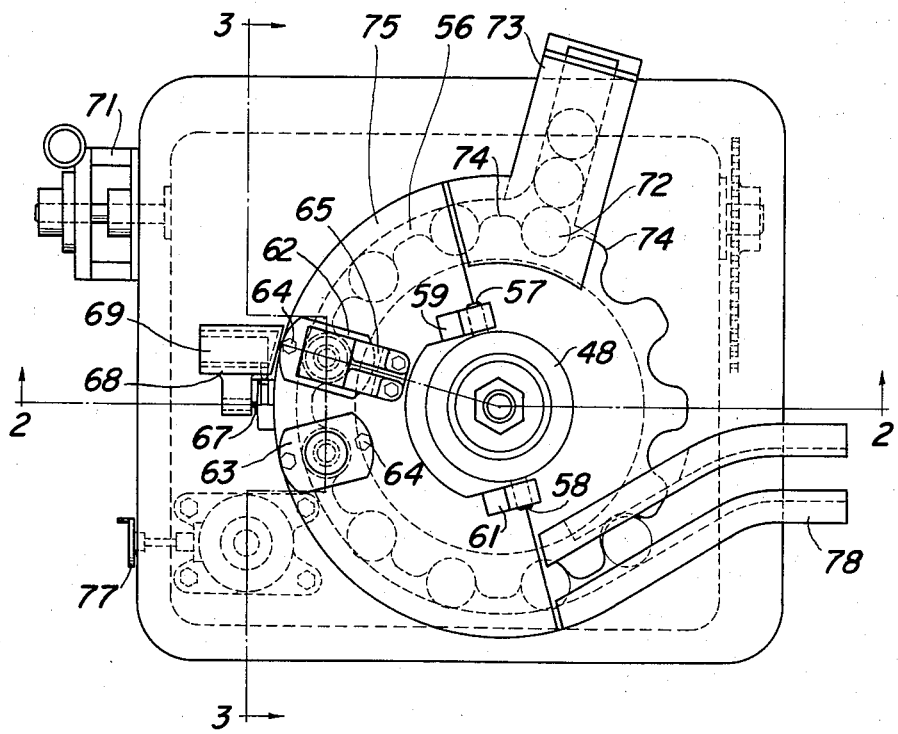
Figure 1 is a top plan view.
Figure 2:
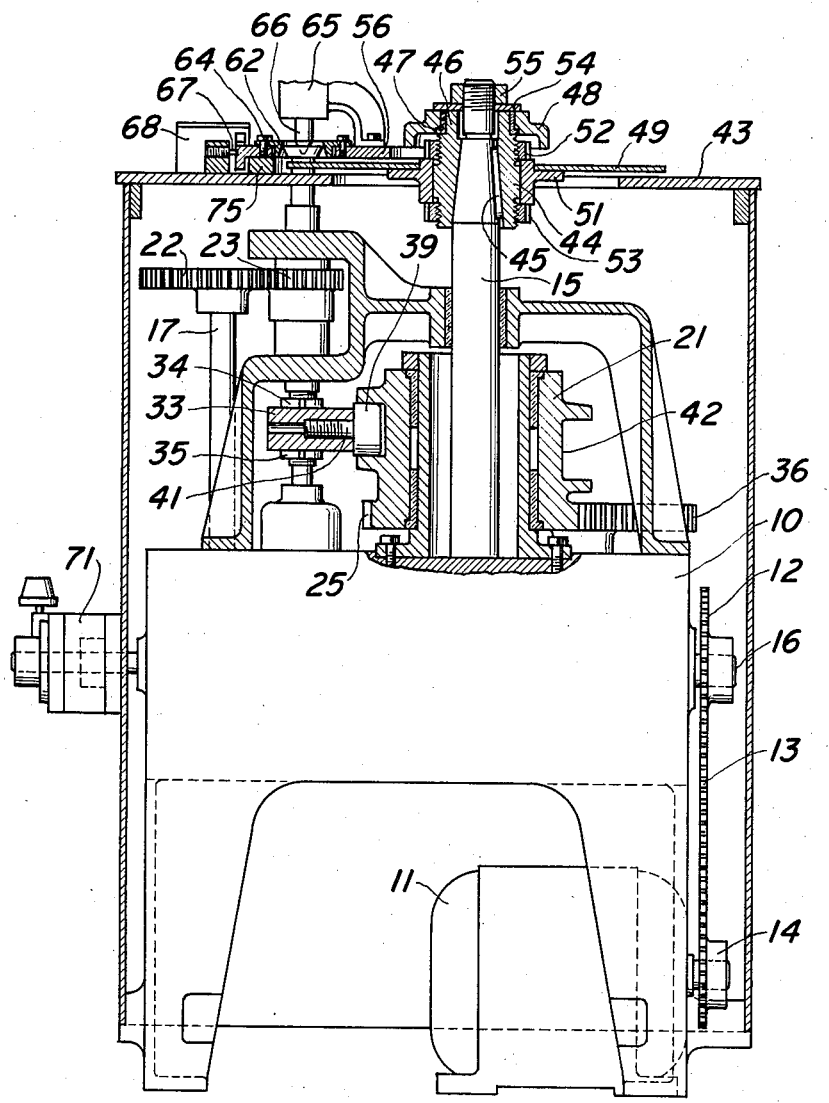
Figure 2 is a vertical cross section on the line 2—2 of Figure 1.
Figure 3:
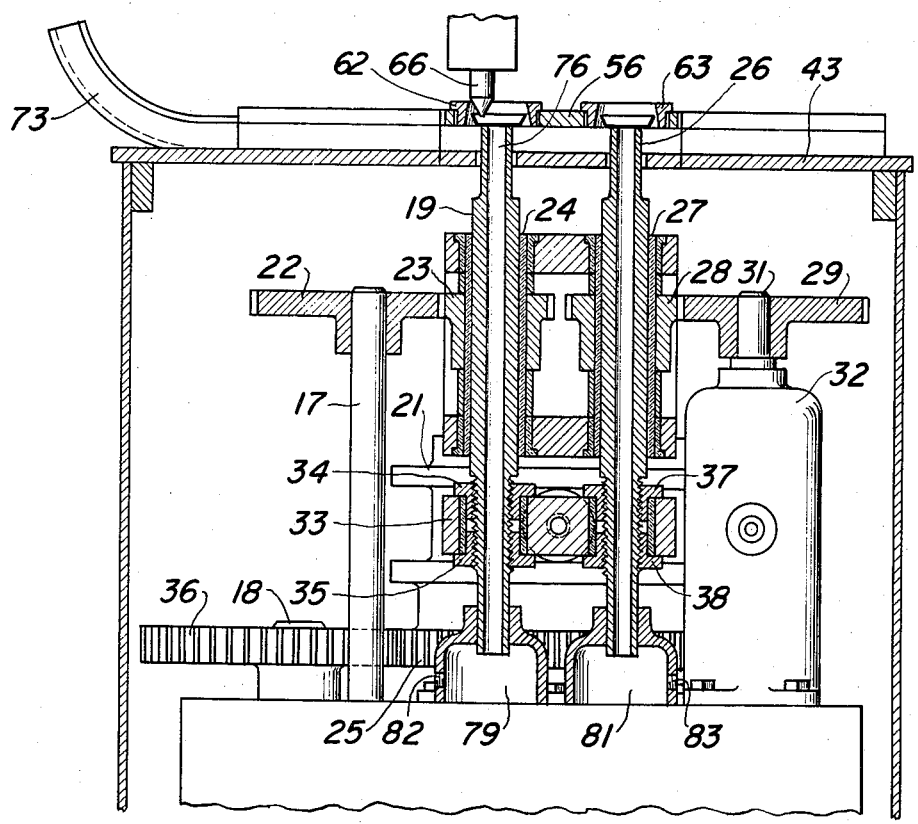
Figure 3 is a portion of the vertical cross section on the line 3—3 of Figure 1.

The machine comprises a standard indexing drive (in this instance a "Ferguson roller gear" drive) indicated at 10 (also termed a stop motion mechanism). The structure of a "Ferguson roller gear" drive is described in U. S. Patent No. 2,714,315 to Reader et al. Power is delivered to the drive sprocket 12 by the motor 11, which is connected through the roller chain 13 and motor sprocket 14. Shaft 15 rotates with an intermittent motion. Two other vertical shafts 17 and 18 driven by miter gears (not shown) connected to the main shaft 16 and rotating continuously drive vacuum chuck 19 and lifting cam 21, respectively. The drive of the chuck is secured by spur gear 22 mounted near the end of shaft 17 meshing with chuck gear 23. This is a quill assembly. Chuck 19 may reciprocate axially in bearing 24 and in chuck gear 23.

Chucks 19 and 26 hold the closures by vacuum. For that reason they are made in the form of hollow shafts, the lower ends of which project into vacuum chests 79 and 81. Both chests are connected through ports 82–83 to a suitable air exhaust apparatus which, while the machine is operating, runs continuously. Lowered pressure in chest 79 is transmitted through chuck bore 76 to seize the closure when it lies on the open upper end of chuck 19. Chuck 26 operates in a similar manner. The advantage of this construction is that, since closures sometimes misfeed, compound squirted from nozzle 66, which misses a closure, is projected into bore 76 and collects in chest 79. It thus cannot plug or dirty the apparatus. The drive of the lifting cam 21 is secured through an integral spur gear 25 formed on its lower margin which meshes with gear 36 fastened to shaft 18.

A second vacuum chuck 26 adjacent chuck 19 is similarly quill mounted and may reciprocate vertically in bearing 27 and in gear 28. Gear 28 meshes with gear 29 carried on the shaft 31 of a variable speed motor 32.

Although less convenient and more bulky than a motor which changes speed electrically, a motor combined with a mechanical speed changing device or mechanical or hydraulic speed changing devices powered by the main motor can be used provided the speed of the power output shaft of such a device may be independently varied over a suitable range. Both chucks 19 and 26 are raised and lowered by the block 33 to which they are locked by the nuts 34—35 and 37—38. Block 33 is moved by cam roller 39, which is fastened to the block by stud 41. Roller 39 follows the circumferential cam track 42 formed in cam 21.

The tapered end of shaft 15 projects through a work table 43. Shaft 15 is fitted with a tapered hub 44 and keyed to the shaft by key 45. An extension 46 of the hub is provided with a bearing 47 about which trunnion cap 48 may turn freely. Closure feed dial 49 is supported by a flange 51 formed on the hub 44 and is attached to the flange. Clearance of the dial 49 above the work table 43 is obtained by the dial adjusting nuts 52 and 53. Washer 54 and shaft nut 55 complete the assembly. Thus, when shaft 15 turns, trunnion cap 48 may remain stationary.

Two trunnions 57 and 58 project from cap 48. These hold hinged cover plate 56 by means of the trunnion brackets 59 and 61. Centering cones 62 and 63 surround the upper margins of chucks 19 and 26 and are attached to the plate 56 by cap screws 64. Bracket 65, also attached to cover plate 56, holds the electropneumatic nozzle 66 over chuck 19. The plate 56 is held in lowered position by the detent 67. The same bracket 68, which holds the detent, also houses a pressure contact switch 69. If closures misfeed in the dial 49, the cover plate-trunnion cap assembly may swing about bearing 47, or if the work pieces start to pile up, cover plate 56 is forced upwards swinging about trunnions 57—58 as it lifts. In either case switch 69 then opens, stopping the machine. A clutch and lever system may be used as a mechanical alternate, but the electric switch is simpler and cheaper. Even if the machine coasts after disconnecting the power, it comes to rest without damage, since the piled-up closures are merely kicked upwardly into free space.

Timing of the electropneumatic nozzle 66 is set by a conventional electric breaker 71, which is attached to the main shaft 16.

The operation of the machine is as follows. Closures (shown in dotted outline in Figure 1) are fed from a conventional closure feeder along an inclined trackway 73. As the dial 49 indexes and stops in advance of trackway 73, a closure 72 enters between the fingers 74—74 of the dial. The closure is then slid over the work surface 43 and is guided by the circular barrier 75. When the dial indexes over chuck 19, cam 21 is now in position to raise the chuck. Since cam 21 continuously rotates although shaft 15 is stopped, chuck 19 rises carrying with it the closure. This is accurately centered on the chuck by centering cone 62. The chuck seizes the closure, since a vacuum develops as soon as bore 76 is closed. The nozzle then opens, places compound in the closure, closes, and the chuck falls. The closure is then swept over chuck 26, where the raising and lowering operations are repeated. Chuck 26, however, is driven by the variable speed motor 32, the speed of which is set to throw the compound into the position desired. Speed change is secured by adjusting handle 77. When the compound has been properly placed by spinning on the second chuck, dial 49 advances carrying the closure with it to the take-away track 78. This track in most commercial installations is connected to an oven belt so that closures leaving the machine pass directly into the cure or drying oven.

The most common cause of shutdown can be corrected without stopping the machine. When the operator notices a drift in the placement of the compound, a slight speeding up or slowing down of the adjustable speed motor is all that is required to correct the drift. This machine will make either the conventional closure, where the sealing material lies adjacent the skirt or the curl of a can end, or will make bottle crowns, where the entire interior is covered with the sealing substance. To make crowns, it is merely necessary to position the nozzle so that the sealing material is projected into the center. Spin of the crown on the second chuck spreads the material across the interior surface and will bank it as desired against the interior wall of the skirt.

We claim:

1. In a machine of the class described, a pair of chucks, intermittently operating means to position closures on the chucks and to remove closures therefrom, means to cause simultaneous axial movement of the chucks during the stop-motion periods of said positioning means, means to rotate the first of said chucks continuously, means including an intermittently operating nozzle positioned over the first chuck to deliver a liquid sealing compound to a closure on said chuck, said positioning means functioning to remove a closure from the first chuck immediately after the chucks have cleared its path and place the closure on the second chuck, means to rotate the second chuck, and means to change the speed of rotation of the second chuck independently during the operation of the machine.

2. In a machine of the class described, power means to drive the machine, a stop-motion mechanism connected to the power means, a vertical shaft intermittently driven by the mechanism, a closure transfer dial affixed to the shaft, a pair of chucks, cam means connected to said power means to cause both chucks to rise and fall simultaneously, means to continuously rotate the first of said chucks, the stop-motion mechanism being timed to advance the dial only when the chucks are in lowered position, a trackway to define the path of closures passing through the machine, a hinged cover plate surmounting the trackway and the dial and lying parallel thereto in its normal position, pressure-responsive means cooperating with the plate adapted to disconnect said power means when the plate is in other than its normal position, an intermittent fluid ejecting device positioned over the first chuck, means to rotate the second chuck, and independent speed adjusting means for changing the speed of rotation of the second chuck.

3. A machine for applying sealing material to a container closure comprising power driving means, an intermittently driven vertical shaft driven by said power means, a cam interconnected with said power means arranged to be driven continuously, a peripheral cam track in said cam, a cam roller and block reciprocated by the cam, a pair of rotatable chucks supported by the block, closure transfer means connected to said vertical shaft arranged to move only when the chucks are in lowered position, means to rotate the first of said pair of chucks continuously, independent variable speed power means arranged to rotate the second of said pair of chucks continuously at a speed appropriate for the proper placement of compound, and means including trackways to direct closures into, through, and away from said machine.

4. The method of producing container closures in which a liquid sealing material is injected into the closure while the closure is positioned beneath a delivery nozzle, which includes the step of securing the desired position and thickness of the sealing material by removing the closure immediately after the sealing material has been deposited therein from its position beneath the delivery nozzle to a separate location and there spinning the closure with its charge of liquid sealing material at such a speed that the material is moved on the closure from its first deposited position to its final, desired position by the force which is thereby developed.

5. In a machine of the class described wherein a work piece transport element is adapted to move work pieces along a stationary trackway, a pivoted plate covering the trackway where work pieces are advanced and lying parallel thereto in normally closed position, said plate adapted to swing upwardly about its pivot in response to thrust developed by jammed work pieces in the trackway, power control means incorporating a switch cooperating with the plate said switch being arranged to disconnect the power when the plate is swung from its normal position by misfed work pieces.

6. In a machine of the class described wherein a work piece transport element is adapted to move work pieces along a stationary trackway, a plate covering the trackway where work pieces are advanced and lying parallel thereto in normally closed position, means to prevent damage to the transport element including a hinge, a latch means to hold the plate in said normally closed position, said latch being releasable in response to an upwardly directed thrust upon said plate to permit the plate to be swung upwardly by jammed or misfed work pieces and to permit the jammed work pieces to be ejected from the trackway without damage to the transport element.

7. In a machine of the class described wherein an intermittently rotating transfer dial is adapted to move work pieces along a circular stationary trackway, a pivoted plate covering the trackway and dial and lying parallel thereto in normally closed position, means to prevent damage to the transfer dial including a hinge, a latch means to hold the plate in said normally closed position, said latch being releasable in response to an upwardly directed thrust upon said plate to permit the plate to be swung upwardly by jammed or misfed work pieces and to permit the jammed work pieces to be ejected from the trackway without damage to the transfer dial.

References Cited in the file of this patent

UNITED STATES PATENTS

| | | |
|---|---|---|
| 2,192,302 | Errett | Mar. 5, 1940 |
| 2,336,162 | Bridges | Dec. 7, 1943 |
| 2,345,415 | Nagy | Mar. 28, 1944 |
| 2,362,058 | Emerson | Nov. 7, 1944 |
| 2,516,908 | Pottle | Aug. 1, 1950 |
| 2,524,545 | Shanklin et al. | Oct. 3, 1950 |
| 2,587,271 | Allen et al. | Feb. 26, 1952 |